United States Patent
Vick, Jr. et al.

(10) Patent No.: US 9,631,456 B2
(45) Date of Patent: Apr. 25, 2017

(54) MULTIPLE PISTON ASSEMBLY FOR SAFETY VALVE

(71) Applicant: Halliburton Energy Services, Inc., Houston, TX (US)

(72) Inventors: James Dan Vick, Jr., Dallas, TX (US); Bruce Edward Scott, McKinney, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 232 days.

(21) Appl. No.: 14/390,688

(22) PCT Filed: Dec. 31, 2013

(86) PCT No.: PCT/US2013/078440
§ 371 (c)(1),
(2) Date: Oct. 3, 2014

(87) PCT Pub. No.: WO2015/102604
PCT Pub. Date: Jul. 9, 2015

(65) Prior Publication Data
US 2016/0258250 A1    Sep. 8, 2016

(51) Int. Cl.
*E21B 34/10*    (2006.01)
*F16K 31/122*    (2006.01)
(Continued)

(52) U.S. Cl.
CPC .......... *E21B 34/10* (2013.01); *F16K 31/124* (2013.01); *F16K 31/1225* (2013.01); *E21B 2034/005* (2013.01)

(58) Field of Classification Search
CPC .............. E21B 34/10; E21B 2034/005; F16K 31/1225; F16K 31/124
See application file for complete search history.

(56) References Cited

U.S. PATENT DOCUMENTS 4,252,197 A    2/1981  Pringle
5,284,205 A    2/1994  Smith
(Continued)

FOREIGN PATENT DOCUMENTS

WO    2015072994 A1    5/2015
WO    2015102603 A1    7/2015
WO    2015102604 A1    7/2015

OTHER PUBLICATIONS

International Search Report and Written Opinion for PCT/US2013/078432 dated Sep. 29, 2014.
(Continued)

*Primary Examiner* — Yong-Suk (Philip) Ro
(74) *Attorney, Agent, or Firm* — McDermott Will & Emery LLP

(57) ABSTRACT

A safety valve includes a housing defining first and secondary piston bores in fluid communication with each other via a port. A first piston is movably arranged within the first piston bore and has a first piston rod extending longitudinally from the first piston and coupled to a flow tube. A second piston is movably arranged within the secondary piston bore and has a secondary piston rod extending longitudinally from the second piston and axially engageable with the flow tube. Hydraulic fluid pressure acts on the first piston until the first piston axially moves and exposes the port, whereby the hydraulic fluid pressure is then able to enter the secondary piston bore and also act on the second piston.

22 Claims, 7 Drawing Sheets

(51) Int. Cl.
*F16K 31/124* (2006.01)
*E21B 34/00* (2006.01)

(56) References Cited

U.S. PATENT DOCUMENTS

| | | | | |
|---|---|---|---|---|
| 5,906,220 | A * | 5/1999 | Thompson | E21B 34/10 137/488 |
| 6,003,605 | A | 12/1999 | Dickson et al. | |
| 6,098,714 | A | 8/2000 | Deaton | |
| 6,109,351 | A * | 8/2000 | Beall | E21B 34/10 166/321 |
| 6,427,778 | B1 * | 8/2002 | Beall | E21B 34/00 166/321 |
| 6,866,101 | B2 * | 3/2005 | Sloan | E21B 34/10 166/320 |
| 2006/0196669 | A1 | 9/2006 | Lauderdale et al. | |
| 2008/0128137 | A1 * | 6/2008 | Anderson | E21B 34/101 166/319 |
| 2009/0218096 | A1 * | 9/2009 | Vick, Jr. | E21B 23/04 166/250.15 |
| 2013/0043039 | A1 | 2/2013 | Sloan et al. | |
| 2013/0092396 | A1 | 4/2013 | Webber et al. | |
| 2015/0211333 | A1 | 7/2015 | Vick, Jr. et al. | |

OTHER PUBLICATIONS

International Search Report and Written Opinion for PCT/US2013/78440 dated Sep. 23, 2014.

* cited by examiner

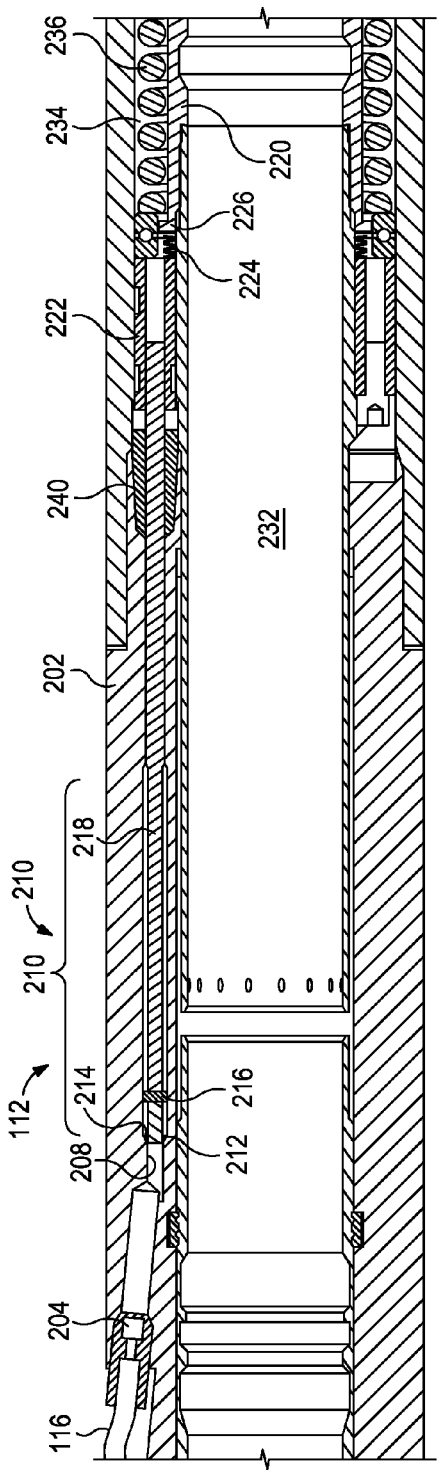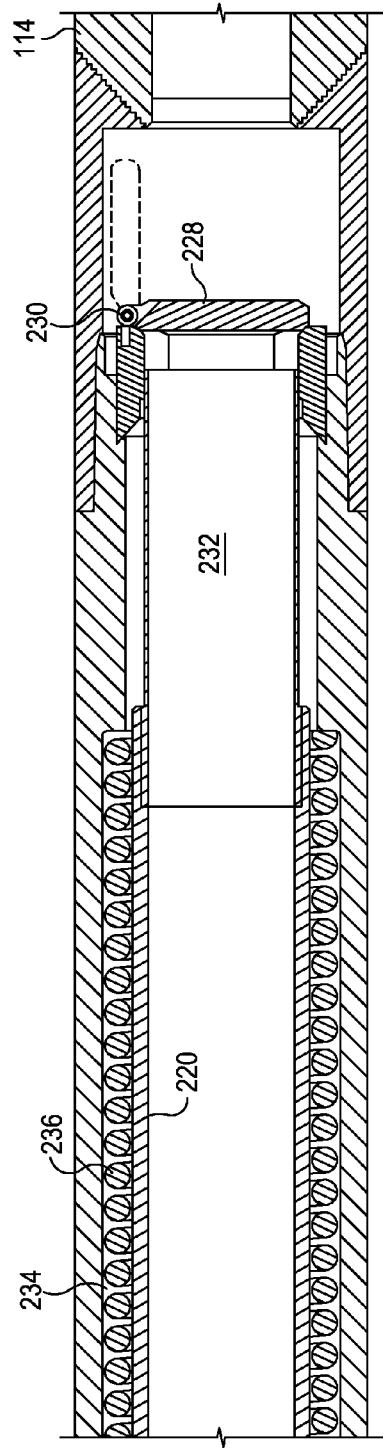
FIG. 2A
FIG. 2B

MULTIPLE PISTON ASSEMBLY FOR SAFETY VALVE

BACKGROUND

The present disclosure relates generally to operations performed and equipment used in conjunction with subterranean wells and, in particular, to subsurface safety valves having a reduced spread between opening and closing pressures.

Subsurface safety valves are well known in the oil and gas industry and act as a failsafe to prevent the uncontrolled release of reservoir fluids in the event of a worst-case scenario surface disaster. Typical subsurface safety valves are flapper-type valves that are opened and closed with the help of a flow tube moving linearly within the production tubular. The flow tube is often controlled hydraulically from the surface and is forced into its open position using a piston and rod assembly that may be hydraulically charged via a control line linked directly to a hydraulic manifold or control panel at the well surface. When sufficient hydraulic pressure is conveyed to the subsurface safety valve via the control line, the piston and rod assembly forces the flow tube downwards, which compresses a spring and simultaneously pushes the flapper downwards to the open position. When the hydraulic pressure is removed from the control line, the spring pushes the flow tube back up, which allows the flapper to move into its closed position.

Depending on the size and depth of the safety valve deployed, the components of the pressure control system used to operate the safety valve can be quite expensive. The cost of a pressure control system may increase as required pressure ratings for the control line and/or the pump equipment increase, which is usually related to the operating depth of the safety valve. There are practical limits to the size and rating of pressure control systems, past which a well operator may not be able to economically or feasibly employ a subsurface safety valve. Accordingly, there is always a need in the industry for the ability to use lower rated pressure control systems for operating subsurface safety valves.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 2A and 2B illustrate cross-sectional side views of the exemplary safety valve of FIG. 1, according to one or more embodiments.

DETAILED DESCRIPTION

The present disclosure relates generally to operations performed and equipment used in conjunction with subterranean wells and, in particular, to subsurface safety valves having a reduced spread between opening and closing pressures.

Disclosed is a subsurface safety valve that reduces the spread between opening and closing pressures. The safety valve includes a piston assembly having a first piston arranged within a first piston bore and one or more secondary pistons arranged within a secondary piston bore that extends parallel to the first piston bore. The first and secondary piston bores may be in fluid communication via a port such that hydraulic fluid pressure introduced into the first piston bore is able to be conveyed into the secondary piston assembly once the first piston axially bypasses the port. At that point, the hydraulic fluid pressure is able to act on both the first and second pistons and thereby axially displace a flow tube of the safety valve using the combined piston areas of the first and second pistons. While the opening and closing pressure spread is typically controlled by the length of the power spring and limited by its practicality, the embodiments disclosed herein provide a safety valve that increases its setting depth and otherwise reduces its control pressure requirements. As a result, operators are able to reduce the size of surface operating pressure equipment and decrease the size and expense of the power spring.

Figure 1:
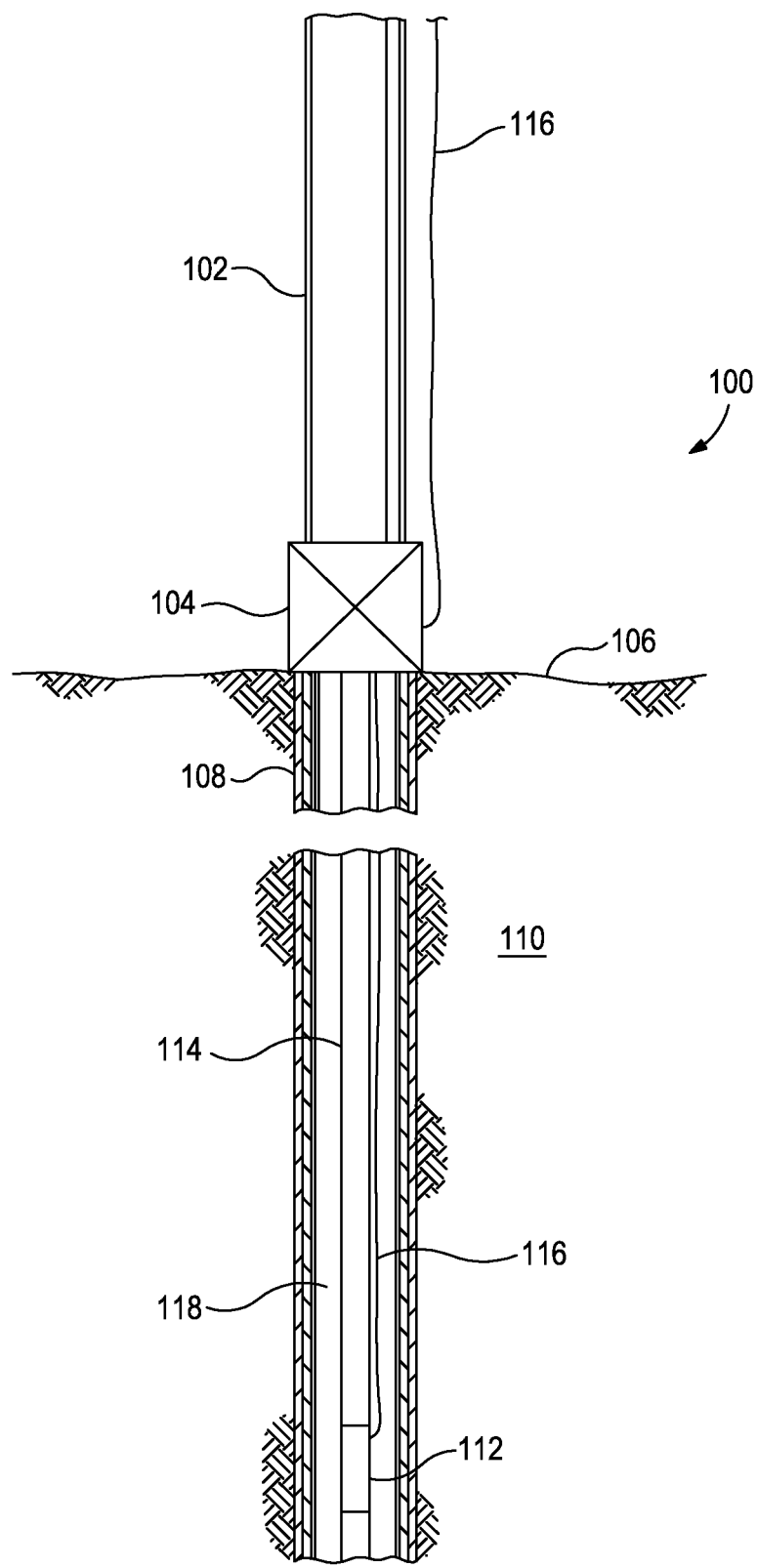
FIG. 1 is a well system that incorporates one or more embodiments of an exemplary safety valve, according to the present disclosure.

Referring to FIG. 1, illustrated is a well system 100 that incorporates one or more embodiments of an exemplary safety valve 112, according to the present disclosure. As illustrated, the well system 100 may include a riser 102 extending from a wellhead installation 104 arranged at a sea floor 106. The riser 102 may extend, for example, to an offshore oil and gas platform (not shown). A wellbore 108 extends downward from the wellhead installation 104 through various earth strata 110. The wellbore 108 is depicted as being cased, but it could equally be an uncased wellbore 108, without departing from the scope of the disclosure. Although FIG. 1 depicts the well system 100 in the context of an offshore oil and gas application, it will be appreciated by those skilled in the art that the various embodiments disclosed herein are equally well suited for use in or on other types of oil and gas rigs, such as land-based oil and gas rigs or rigs located at any other geographical site. Thus, it should be understood that the disclosure is not limited to any particular type of well.

The well system 100 may further include a safety valve 112 interconnected with a tubing string 114 arranged within the wellbore 108 and extending from the wellhead installation 104. The tubing string 114 may be configured to communicate fluids derived from the wellbore 108 and the surrounding subterranean formations to the well surface via the wellhead installation 104. A control line 116 may extend from the well surface and into the wellhead installation 104 which, in turn, conveys the control line 116 into an annulus 118 defined between the wellbore 108 and the tubing string 114. The control line 116 may extend downward within the annulus 118 and eventually become communicably coupled to the safety valve 112. As discussed in more detail below, the control line 116 may be configured to actuate the safety valve 112, for example, to maintain the safety valve 112 in an open position, or otherwise to close the safety valve 112 and thereby prevent a blowout in the event of an emergency.

In some embodiments, the control line 116 may be a hydraulic conduit that provides hydraulic fluid pressure to the safety valve 112. In operation, hydraulic fluid may be applied to the control line 116 from a hydraulic manifold (not shown) arranged at a remote location, such as at a production platform or a subsea control station. When properly applied, the hydraulic pressure derived from the control line 116 may be configured to open and maintain the safety valve 112 in its open position, thereby allowing production fluids to flow through the tubing string. To move the safety valve 112 from its open position and into a closed position, the hydraulic pressure in the control line 116 may be reduced or otherwise eliminated.

Although the control line 116 is depicted in FIG. 1 as being arranged external to the tubing string 114, it will be readily appreciated by those skilled in the art that any hydraulic line may be used to convey actuation pressure to the safety valve 112. For example, the hydraulic line could be internal to the tubing string 114, or otherwise formed in a sidewall of the tubing string 114. The hydraulic line could extend from a remote location, such as from the earth's surface, or another location in the wellbore 108. In yet other embodiments, the actuation pressure could be generated by a pump or other pressure generation device communicably coupled to the safety valve 112 via the control line 116.

In the following description of the representative embodiments of the disclosure, directional terms such as "above", "below", "upper", "lower", etc., are used for convenience in referring to the accompanying drawings. In general, "above", "upper", "upward" and similar terms refer to a direction toward the earth's surface along the wellbore 108, and "below", "lower", "downward" and similar terms refer to a direction away from the earth's surface along the wellbore 108.

Referring now to FIGS. 2A and 2B, with continued reference to FIG. 1, illustrated are cross-sectional side views of an exemplary embodiment of the safety valve 112, according to one or more embodiments. In particular, the safety valve 112 is depicted in FIGS. 2A and 2B in successive sectional views, where FIG. 2A depicts an upper portion of the safety valve 112 and FIG. 2B depicts a lower portion of the safety valve 112. As illustrated, the safety valve 112 may include a housing 202 that is able to be coupled to the tubing string 114 at opposing ends of the housing 202 (tubing string 114 shown only in FIG. 2B).

A control line port 204 may be defined or otherwise provided in the housing 202 for fluidly connecting the control line 116 to the safety valve 112. The control line 116 may be configured to convey hydraulic fluid to a piston bore 208 defined within the safety valve 112 and thereby enabling the safety valve 112 to be pressurized when desired. The piston bore 208 may be an elongate channel or conduit defined within the housing 202 and configured to extend longitudinally along a portion of the axial length of the safety valve 112.

A piston assembly 210 may be arranged within the piston bore 208 and configured to translate axially therein. The piston assembly 210 may include a piston head 212 configured to mate with and otherwise bias an up stop 214 defined within the piston bore 208 when the piston assembly 210 is forced upwards in the direction of the control line port 204. The up stop 214 may be a radial shoulder defined within the piston bore 208 and having a reduced diameter and an axial surface configured to engage a corresponding axial surface of the piston head 212. In other embodiments, the up stop 214 may be any device or means arranged within the piston bore 208 that is configured to stop the axial movement of the piston assembly 210 as it advances within the piston bore 208 toward the control line port 204.

As discussed in greater detail below, the piston assembly 210 may include at least two pistons (one shown in FIG. 2A as piston 216) configured to axially translate as acted upon by the control line 116 pressure. One of the pistons 216 may be operatively coupled to the piston head 212 and otherwise movably arranged within the piston bore 208. At least one other piston (not shown) may be movably arranged in a secondary piston bore (not shown) that runs parallel to the piston bore 208. A piston rod 218 may be coupled to and extend longitudinally from the piston 216 through at least a portion of the piston bore 208. At a distal end thereof, the piston rod 218 may be operatively coupled to a flow tube 220 that is movably arranged within the safety valve 112. The additional pistons (not shown) that may be used in the piston assembly 210 may be coupled to corresponding secondary piston rods (not shown) that extend longitudinally within their corresponding secondary piston bores.

In the illustrated embodiment, the piston rod 218 may be coupled to an actuator sleeve 222, and the actuator sleeve 222 may engage a biasing device 224 (e.g., a compression spring, a series of Belleville washers, or the like) arranged axially between the actuator sleeve 222 and an actuation flange 226. The actuation flange 226 forms part of the proximal end of the flow tube 220. As the actuator sleeve 222 acts on the biasing device 224 (e.g., axial force), the actuation flange 226 and the flow tube 220 correspondingly move. While not depicted in FIG. 2A, and as will be described in greater detail below, the secondary piston rods (not shown) may also be configured to axially engage the flow tube 220 when acted upon by the control pressure derived from the control line 116.

Referring to FIG. 2B, the safety valve 112 may also include a valve closure device 228 that selectively opens and closes a flow passage 232 defined through the interior of the safety valve 112. The valve closure device 228 may be a flapper, as generally known to those skilled in the art. It should be noted, however, that although the safety valve 112 is depicted as being a flapper-type safety valve, those skilled in the art will readily appreciate that any type of closure device 228 may be employed, without departing from the scope of the disclosure. For example, in some embodiments, the closure device 228 could instead be a ball, a sleeve, or any other type of device that may be used to substantially occlude the flow passage 232.

As shown in FIG. 2B, the closure device 228 is shown in its closed position whereby the closure device 228 is able to substantially block fluid flow into and through the flow passage 232 from downhole. A torsion spring 230 biases the closure device 228 to pivot to its closed position. The piston assembly 210 is used to displace the flow tube 220 downward (i.e., to the right in FIG. 2B) to engage the closure device 228 and overcome the spring force of the torsion spring 230. When the flow tube 220 is extended to its downward position, it engages and moves the closure device 228 from its closed position to an open position (shown in phantom as dashed lines). When the flow tube 220 is displaced back upward (i.e., to the left in FIG. 2B), the torsion spring 230 is able to pivot the closure device 228 back to its closed position. Axial movement of the piston assembly 210 within the piston bore 208 will force the flow tube 220 to correspondingly move axially within the flow passage 232, and either open the closure device 228 or allow it to close, depending on its relative position.

The safety valve 112 may further define a lower chamber 234 within the housing 202. In some embodiments, the lower chamber 234 may form part of the piston bore 208 (and secondary piston bores), such as being an elongate extension thereof. A power spring 236, such as a coil or compression spring, may be arranged within the lower chamber 234. The power spring 236 may be configured to bias the actuation flange 226 and actuation sleeve 222 upwardly which, in turn, biases the piston assembly 210 in the same direction. Accordingly, expansion of the power spring 236 will cause the piston assembly 210 to move upwardly within the piston bore 208.

It should be noted that while the power spring 236 is depicted as a coiled compression spring, any type of biasing device may be used instead of, or in addition to, the power spring 236, without departing from the scope of the disclosure. For example, a compressed gas, such as nitrogen, with appropriate seals may be used in place of the power spring 236. In other embodiments, the compressed gas may be contained in a separate chamber and tapped when needed.

In exemplary operation, the safety valve 112 may be actuated in order to open the closure device 228. This may be accomplished by conveying hydraulic fluid under pressure (i.e., control pressure) to the control line port 204 via the control line 116. As hydraulic pressure is provided to the piston bore 208, the piston 216 (and any additional pistons) assumes the hydraulic force and the piston assembly 210 is forced to move axially downward within the piston bore 208. As the piston assembly 210 moves, the piston rod 218 mechanically transfers the hydraulic force to the actuation sleeve 222 and the actuation flange 226, thereby correspondingly displacing the flow tube 220 in the downward direction. Any secondary piston rods (not shown) used in the piston assembly 210 may also act on the flow tube 220 and similarly transfer hydraulic force thereto. In other words, as the piston assembly 210 moves axially within the piston bore 208, the flow tube correspondingly moves in the same direction. As the flow tube 220 moves downward, it engages the closure device 228, overcomes the spring force of the torsion spring 230, and thereby pivots the closure device 228 to its open position to permit fluids to enter the flow passage 232 from below.

Moreover, as the piston assembly 210 moves axially downward within the piston bore 208, the power spring 236 is compressed within the lower chamber 234 and progressively builds spring force. In at least one embodiment, the piston assembly 210 will continue its axial movement in the downward direction, and thereby continue to compress the power spring 236, until engaging a down stop 240 (FIG. 2A) arranged within the piston bore 208. A metal-to-metal seal may be created between the piston assembly 210 and the down stop 240 such that the migration of fluids (e.g., hydraulic fluids, production fluids, etc.) therethrough is generally prevented.

Upon reducing or eliminating the hydraulic pressure provided to the piston bore 208 via the control line 116, the spring force built up in the power spring 236 may be allowed to release and displace the piston assembly 210 upwards within the piston bore 208, thereby correspondingly moving the flow tube 220 in the same direction. The pressure within the safety valve 112 below the piston 216 (i.e., the section pressure) also helps move the piston assembly 210 upwards within the piston bore 208. As the flow tube 220 moves axially upwards, it will eventually move out of engagement with the closure device 228, thereby allowing the spring force of the torsion spring 230 to pivot the closure device 228 back into its closed position.

In at least one embodiment, the piston assembly 210 will continue its axial movement in the upward direction until the piston head 212 engages the up stop 214 and effectively prevents the piston assembly 210 from further upward movement. Engagement between the piston head 212 and the up stop 214 may generate a mechanical metal-to-metal seal between the two components to prevent the migration of fluids (e.g., hydraulic fluids, production fluids, etc.) therethrough.

When the safety valve 112 is deployed downhole, the "section" pressure, or fluid pressure present within the wellbore 108 (FIG. 1) and annulus 118 (FIG. 1) at depth, cooperatively act on the piston assembly 210. More specifically, the section pressure acts on the downhole end of the piston assembly 210, and provides a corresponding closing force on the safety valve 112 that urges the piston assembly 210 toward the up stop 214. In order to open the safety valve 112, the piston assembly 210 must effectively overcome the section pressure and the spring force of the power spring 236. To do this, the control pressure conveyed into the piston bore 208 via the control line 116 must be supplied at a pressure that exceeds the combined force of the section pressure and the power spring 238. Moreover, this hydraulic pressure must incrementally increase as the piston assembly 210 translates downward within the piston bore 208 to counteract the increasing spring force that builds as the power spring 238 is compressed. As indicated above, this oftentimes requires expensive pressure control systems that may be infeasible or uneconomical for some applications.

According to one or more embodiments of the present disclosure, the pressure required to open the safety valve 112 may be reduced or otherwise minimized by increasing the downward force derived from the control pressure. This can be accomplished by having a multiple piston configuration in the piston assembly 210 whereby the control pressure acts on multiple pistons that are each operatively coupled to the flow tube 220. As will be appreciated, employing multiple pistons may serve to intensify the available force from the control pressure.

Figure 3A:
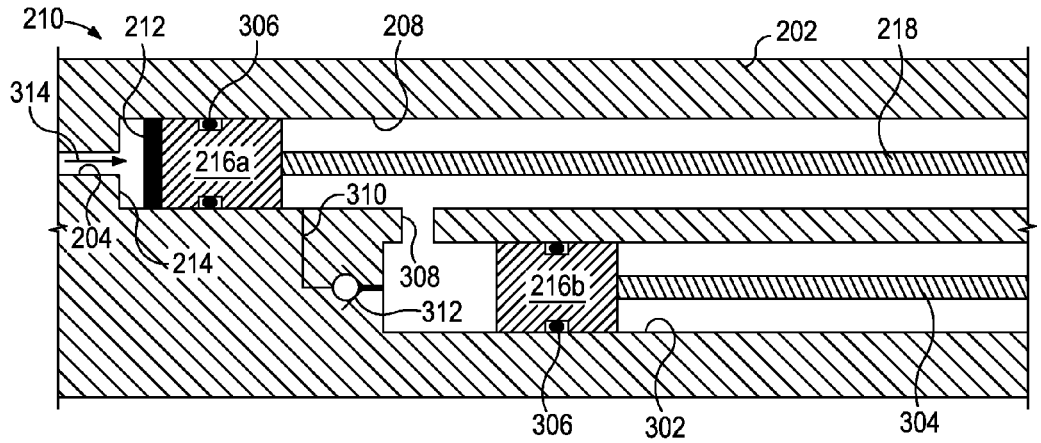
FIGS. 3A-3C illustrate enlarged cross-sectional side views of an exemplary embodiment of the piston assembly of FIG. 2A, according to one or more embodiments.
Figure 3B:
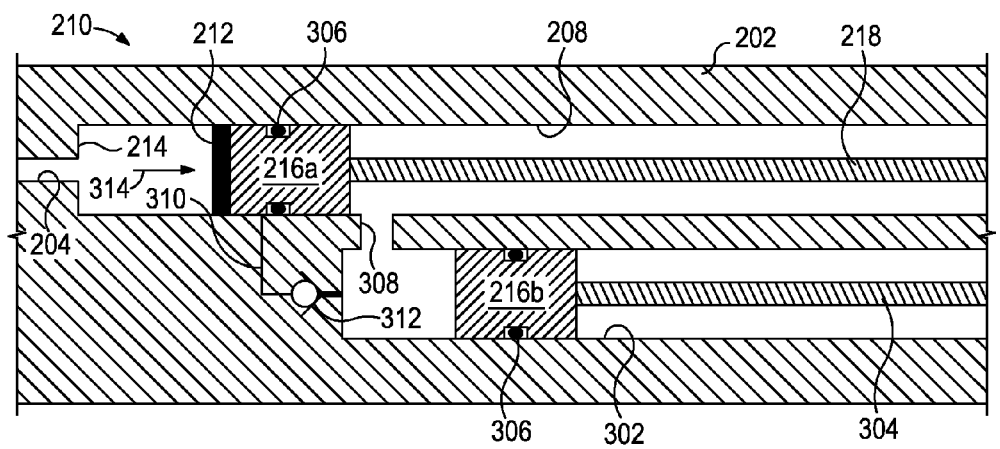
Figure 3C:
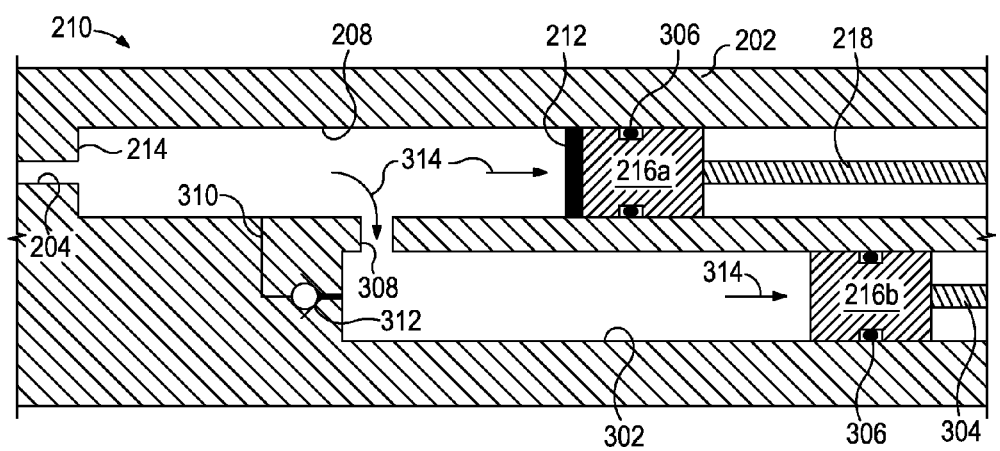

Referring now to FIGS. 3A-3C, with continued reference to FIGS. 2A and 2B, illustrated are enlarged cross-sectional side views of an exemplary embodiment of the piston assembly 210, according to one or more embodiments. Like numerals in FIGS. 3A-3C that are used in FIGS. 2A and 2B indicate like elements and/or components that will not be described again in detail. FIGS. 3A-3C depict progressive views of the piston assembly 210 during its exemplary operation. More particularly, FIG. 3A depicts the piston assembly 210 in a first position, where the safety valve 112 (FIGS. 2A-2B) is closed, as generally discussed above. FIG. 3B depicts the piston assembly 210 in an intermediate position, and FIG. 3C depicts the piston assembly 210 in a second position where the safety valve 112 has been opened or is otherwise proceeding towards its open position, as also generally discussed above.

As illustrated, the piston assembly 210 includes the piston 216, shown as a first piston 216a, and a second piston 216b. The first piston 216a is movably arranged within the piston bore 208 defined in the housing 202 of the safety valve 112 (FIGS. 2A-2B). The piston rod 218 may be coupled to the first piston 216a and extend longitudinally therefrom within the piston bore 208. The first piston 216a may include the piston head 212 which, as generally described above, may be configured to engage the up stop 214 defined at or near the control line port 204 in order to generate a mechanical metal-to-metal seal between the two components. It will be appreciated that the piston head 212 is depicted in FIGS.

3A-3C merely for illustrative purposes and is not necessarily drawn to scale. In some embodiments, for example, the piston head 212 may provide or exhibit a tapered surface configured to seal against a corresponding tapered or conical surface of the up stop 214, without departing from the scope of the disclosure.

The second piston 216b may be movably arranged within a secondary piston bore 302 also defined in the housing 202 of the safety valve 112 (FIGS. 2A-2B). As illustrated, a secondary piston rod 304 may be operatively coupled to the second piston 216b and extend longitudinally therefrom within the secondary piston bore 302. The piston bore 208 and secondary piston bore 302 may extend substantially parallel to each other within the housing 202. In some embodiments, the piston bores 208, 302 may be laterally offset from each other in the housing 202 or, in other words, angularly offset from each other about a circumference of the housing 202. In other embodiments, the piston bores 208, 302 may be radially offset from each other in the housing 202. In yet other embodiments, the piston bores 208, 302 may be both laterally and radially offset from each other in the housing 202, without departing from the scope of the disclosure.

While the piston assembly 210 is depicted in FIGS. 3A-3C as having or otherwise employing two pistons 216a, b, those skilled in the art will readily recognize that more than two pistons may be employed in the piston assembly 210, without departing from the scope of the disclosure. Each additional piston used in the piston assembly 210, for example, may be movably arranged within a corresponding additional piston bore (not shown) and may be configured to generally operate substantially similar to the second piston 216b described herein. Moreover, while the first and second pistons 216a,b are depicted in FIGS. 3A-3C as exhibiting approximately the same size, shape, and/or configuration, it is contemplated herein to employ pistons of varying sizes arranged within corresponding piston bores configured to accommodate the particular varied size(s), also without departing from the scope of the disclosure.

In addition to varying the size of the corresponding piston bores 208, 302, it is further contemplated herein to have more than one first piston 216a and/or more than one second piston 216b. As a result, more than one piston may function as either the primary piston (first piston 216a) and/or the secondary piston (second piston 216b). In the illustrated embodiment, the first and second pistons 216a,b (i.e., primary and secondary pistons, respectively) provide a total piston area that translates from one piston (i.e., the primary piston) to two pistons (i.e., one primary piston plus one secondary piston). In other embodiments, however, there could be two primary pistons and one secondary piston where the total piston area translates from two pistons (i.e., two primary pistons) to three pistons (i.e., two primary pistons plus one secondary piston). In yet other embodiments, there could be one primary piston and two secondary pistons where the total piston area translates from one piston (i.e., the primary piston) to three pistons (i.e., one primary piston plus two secondary pistons). Using just these three examples the piston ratio could be configured as 1:2, 2:3, and 1:3.

The first and second pistons 216a,b may each be sized or otherwise configured such that they are able to sealingly engage the corresponding inner walls of the piston bores 208, 302 as they axially translate therein. To help facilitate this, the pistons 216a,b may include and/or incorporate one or more dynamic seals 306. The dynamic seals 306 may be configured to "dynamically" seal against the inner walls of the piston bores 208, 302, thereby substantially preventing fluids from migrating past the first and second pistons 216a,b in either direction. In some embodiments, at least one of the dynamic seals 306 may be an O-ring or the like, as illustrated. In other embodiments, however, at least one of the dynamic seals 306 may be a set of v-rings or CHEVRON® packing rings, or other appropriate seal configurations (e.g., seals that are round, v-shaped, u-shaped, square, oval, t-shaped, etc.), as generally known to those skilled in the art, or any combination thereof.

As discussed above, the piston rod 218 may be operatively coupled to the flow tube 220 (FIG. 2A) at its distal end (not shown) such that movement of the first piston 216a correspondingly moves the flow tube 220, and vice versa. The secondary piston bore 302 may extend such that the secondary piston rod 304 may also be able to engage and otherwise interact with the flow tube 220. More particularly, the secondary piston rod 304 may be able to axially engage the flow tube 220, but may not necessarily be fixedly coupled thereto. As a result, until an actual axial engagement between the secondary piston rod 304 and the flow tube 220 develops, movement of the second piston 216b within the secondary piston bore 302 will not serve to move the flow tube 220, and vice versa.

The piston bore 208 may be in fluid communication with the secondary piston bore 302 via at least one port 308 defined in the housing 302 and extending between the two piston bores 208, 302. The piston bore 208 may further be in fluid communication with the secondary piston bore 302 via a return conduit 310 that extends between the two piston bores 208, 302. The return conduit 320 may have a check valve 312 arranged therein and the check valve 312 may be configured to substantially prevent fluid flow from the piston bore 208 to the secondary piston bore 302, but allow fluid flow from the secondary piston bore 302 to the piston bore 208. As will be described in greater detail below, the return conduit 310 and associated check valve 312 may be used to relieve trapped fluid pressure and volume within the secondary piston bore 302 during operation of the piston assembly 210.

In exemplary operation, hydraulic pressure or "control" pressure may be introduced into the piston bore 208 via the control line 116 (FIGS. 1 and 2A) and associated control line port 204, as indicated by the arrows 314. Initially, the safety valve 112 (FIGS. 2A-2B) is in the closed position and the flow tube 220 (FIGS. 2A and 2B) is in its upmost position. As shown in FIG. 3A, the control pressure 314 is able to act on the piston head 212, thereby separating the piston head 212 from the up stop 214 and starting the first piston 216a moving in the downward direction (i.e., to the right in FIGS. 3A-3C). Since the first piston 216a sealingly engages the inner wall of the piston bore 208, the control pressure 314 may be able to act on the full piston area of the first piston 216a to move the piston assembly 210 in the downward direction.

Referring to FIG. 3B, as the first piston 216a moves in the downward direction, the flow tube 220 (FIGS. 2A and 2B) also begins to correspondingly move in the same direction as operatively coupled to the piston rod 218. During the beginning of the stroke of the first piston 216a, the control pressure 314 is isolated from and therefore unable to act on the second piston 216b, which may remain relatively motionless within the secondary piston bore 302. An opposing "section" pressure and the spring force of the power spring 236 (FIGS. 2A-2B) cooperatively act against the control pressure 314. The further downward the flow tube 220 moves, the greater the spring force that is built up in the power spring 236.

In FIG. 3C, the first piston 216a is depicted as having axially bypassed the port 308, thereby allowing the control pressure 314 to escape into or otherwise enter the secondary piston bore 302 via the port 308. Once entering the secondary piston bore 302, the control pressure 314 may then be able to act on the second piston 216b, thereby forcing the secondary piston rod 304 into axial engagement with the flow tube 220 (FIG. 2A). Since the second piston 216b sealingly engages the inner wall of the secondary piston bore 302, the control pressure 314 is also able to act on the full piston area of the second piston 216b. As a result, once the control pressure 314 is able to act on both the first and second pistons 216a,b, an increased amount of hydraulic force may be applied on the flow tube 220 commensurate with the combined piston areas of both the first and second pistons 216a,b.

Accordingly, while the opposing force of the power spring 236 (FIGS. 2A-2B) steadily increases as the safety valve 112 (FIGS. 2A-2B) moves from closed to open positions, the piston area on which the control pressure 314 is able to act upon also increases once the secondary piston bore 302 is exposed and the second piston 216b is able to assume hydraulic pressure from the control pressure 314. With a larger combined piston area being acted upon, less hydraulic pressure via the control line 116 (FIGS. 1 and 2A) may be needed to move the piston assembly 210 toward the end of its stroke. More particularly, once the control pressure 314 is able to act on the second piston 216b, additional pressure via the control line 116 is not required to continue movement to the open position, since an increased opening hydraulic force is provided with the same pressure as a result of the increased piston area. An operator may therefore be able to employ a smaller or reduced pressure control system used to convey the control pressure 314 to the safety valve 112, including using control lines and pump equipment that exhibit lower pressure ratings than would otherwise be used in a safety valve at similar depths. Smaller or reduced pressure control systems may be advantageous for safety reasons (i.e., lower pressures are typically safer than higher pressures), cost (i.e., reducing the size of the pump and the pressure rating of the pump and control lines can result in significant cost savings), and physical restraints (i.e., lower pressure equipment normally exhibits a smaller footprint than higher pressure equipment).

Figure 4A:
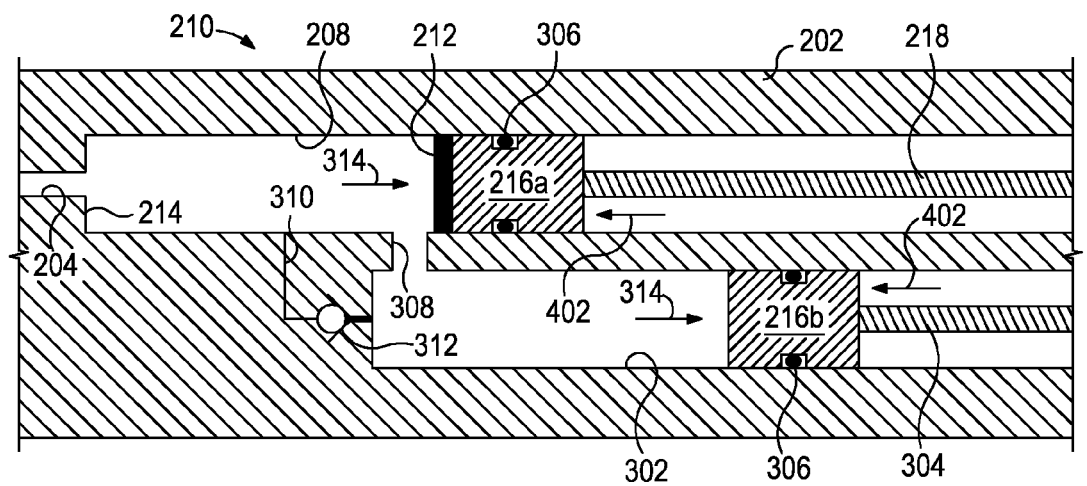
FIGS. 4A and 4B illustrate progressive cross-sectional side views of the piston assembly of FIGS. 3A-3C moving back to a closed position, according to one or more embodiments.
Figure 4B:
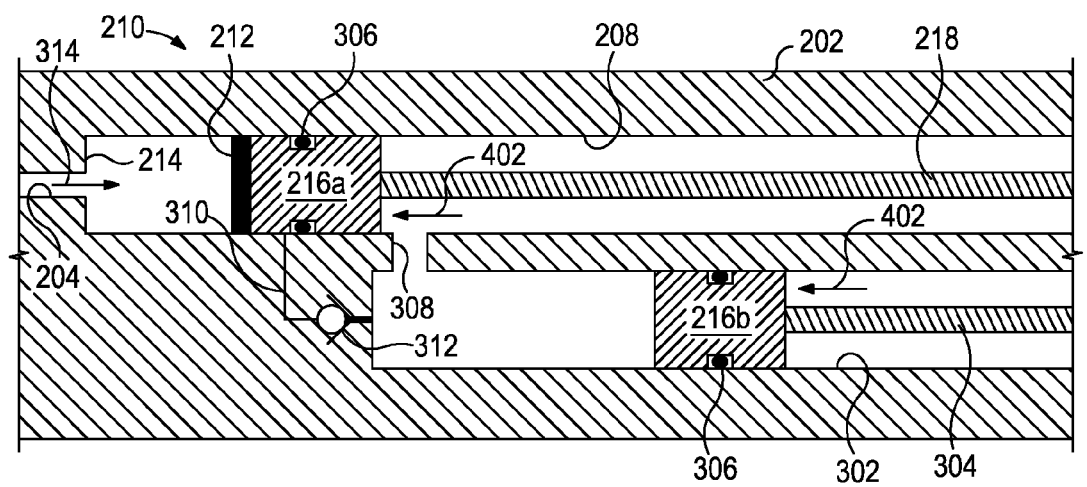

When it is desired to move the safety valve 112 (FIGS. 2A-2B) back to the closed position, the control pressure 314 may be reduced or otherwise eliminated. Referring to FIGS. 4A and 4B, with continued reference to FIGS. 3A-3C, illustrated are progressive cross-sectional side views of the piston assembly 210 as the safety valve 112 is moved back to the closed position, according to one or more embodiments. Once the control pressure 314 provided to the pistons bores 208, 302 is reduced, the spring force built up in the power spring 236 (FIGS. 2A-2B) and the section pressure below the piston assembly 210 may act on the piston assembly 210, as indicated by the arrows 402. The opposing forces 402 may serve to displace the piston assembly 210 back upwards within the piston bores 208, 302 (e.g., to the left in FIGS. 4A and 4B).

In FIG. 4A, as the pistons 216a,b move axially upward within their corresponding piston bores 208, 302, the fluid pressure present within the piston bores 208, 302 is able to escape via the control line port 204. The fluid pressure within the secondary piston bore 302, for instance, may escape into the piston bore 208 via the port 308. Once the first piston 216a encounters and occludes the port 308, however, the fluid pressure present within the secondary piston bore 302 is prevented from escaping into the piston bore 208 via the port 308. At this point, the trapped volume of fluid may instead be able to escape the secondary piston bore 302 via the return conduit 310 and associated check valve 312. As illustrated, the return conduit 310 may fluidly communicate with the piston bore 208, thereby allowing the trapped volume located in the secondary piston bore 302 to be relieved into the piston bore 208 as the opposing force 402 continues to move the second piston 216b in the upwards direction.

In FIG. 4B, once the first piston 216b axially traverses or passes the port 308, the remaining trapped volume of the fluid within the secondary piston bore 302 may escape into the piston bore 208 through the port 308 and the safety valve 112 (FIGS. 2A-2B) is free to close. At this point, only the piston area of the first piston 216a acts on the flow tube 220 (FIGS. 2A and 2B). This may prove advantageous since, as the power spring 236 (FIGS. 2A and 2B) expands, its spring force correspondingly decreases. As a result, less hydrostatic head force will be acting against the power spring 236, thereby allowing the safety valve 112 (FIGS. 2A-2B) to close at a pressure that is closer to the pressure required for its opening.

Figure 5A:
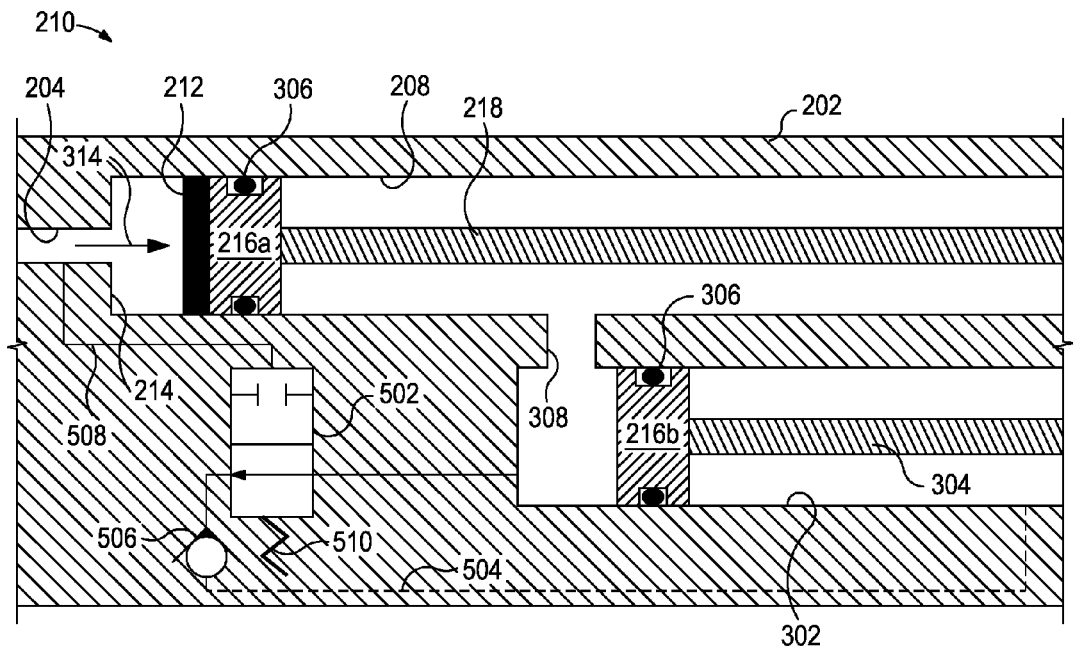
FIGS. 5A-5C illustrate enlarged cross-sectional side views of another exemplary embodiment of the piston assembly of FIG. 2A, according to one or more embodiments.
Figure 5B:
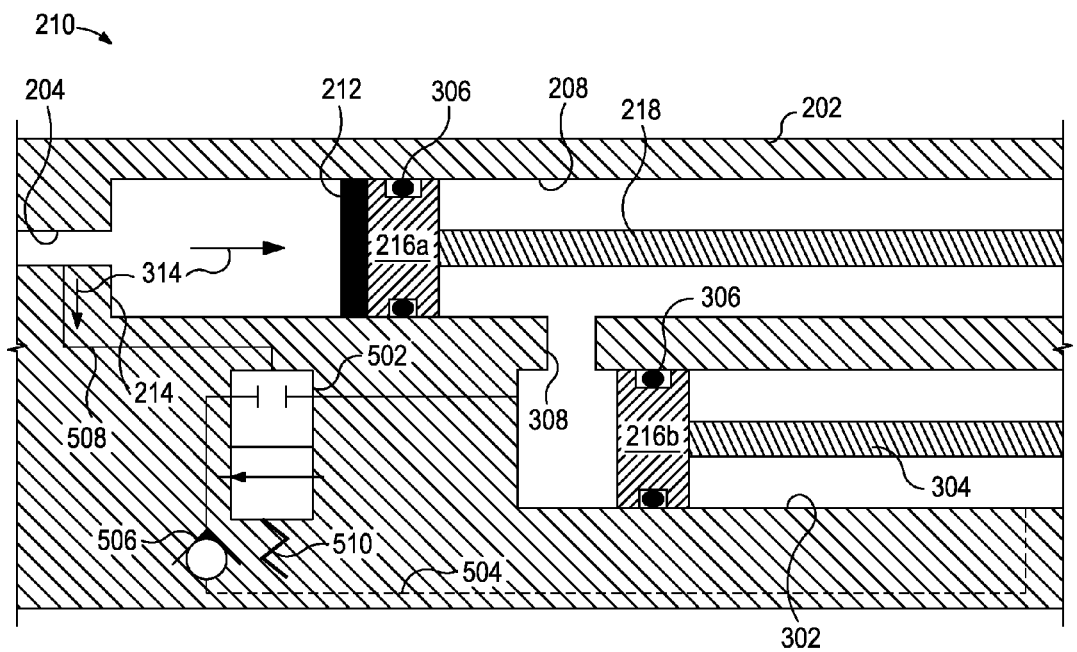
Figure 5C:
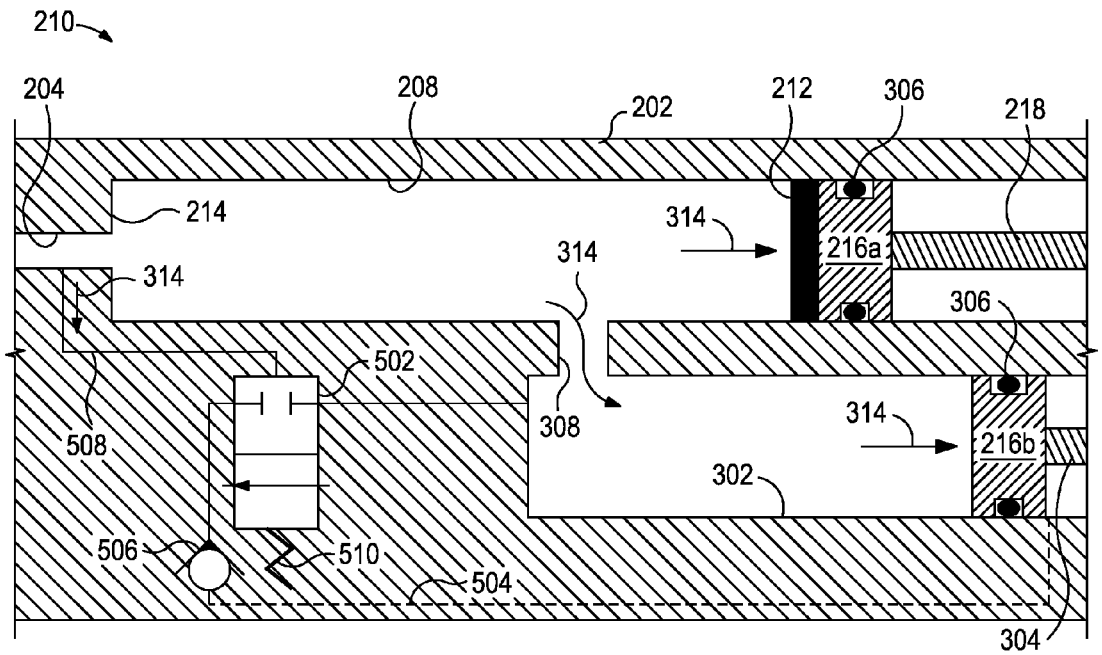

Referring now to FIGS. 5A-5C, with continued reference to FIGS. 3A-3C, illustrated are enlarged cross-sectional side views of another exemplary embodiment of the piston assembly 210, according to one or more embodiments. Like numerals in FIGS. 5A-5C that are used in FIGS. 2A-2B and 3A-3C indicate like elements and/or components that will not be described again in detail. Similar to FIGS. 3A-3C, FIGS. 5A-5C depict progressive views of the piston assembly 210 during its exemplary operation. More particularly, FIG. 5A depicts the piston assembly 210 in a first position, where the safety valve 112 (FIGS. 2A-2B) is closed, as generally discussed above. FIG. 5B depicts the piston assembly 210 in an intermediate position, and FIG. 5C depicts the piston assembly 210 in a second position where the safety valve 112 has been opened or is otherwise proceeding towards its open position, as also generally discussed above.

As illustrated, the piston assembly 210 includes the first and second pistons 216a,b movably arranged within the piston bore 208 and the secondary piston bore 302, respectively. Again, each piston 216a,b may be configured to sealingly engage the corresponding inner walls of the piston bores 208, 302, respectively, as they axially translate therein. The one or more dynamic seals 306 may be used to help such dynamic sealing. The piston bore 208 may be in fluid communication with the secondary piston bore 302 via the port 308 defined in the housing 302 and generally extending between the two piston bores 208, 302.

The piston assembly 210 may further include a two-position valve 502 movable between a first or open position, as generally depicted in FIG. 5A, and a second or closed position, as generally depicted in FIGS. 5B and 5C. In the open position, a return path 504 is opened and allows fluid communication through the two-position valve 502 between portions of the secondary piston bore 302 above and below the second piston 216b. In the closed position, however, the two-position valve 502 is moved such that the return path 504 is blocked and otherwise prevents fluid communication above and below the second piston 216b within the secondary piston bore 302.

The return path 504 may have a check valve 506 arranged therein. As discussed below, the check valve 506 may be configured to prevent section pressure (i.e., produced fluids) from acting on the pistons 216a,b and otherwise from inadvertently proceeding up the control line 116 (FIGS. 1 and 2A). Similar to the check valve 312 of FIGS. 3A-3C, the check valve 506 may also be used to relieve trapped fluid pressure and volume within the secondary piston bore 302 during operation of the piston assembly 210.

The two-position valve 502 may also be fluidly coupled to the control line port 204 via an actuator conduit 508. The actuator conduit 508 may be configured to provide hydraulic pressure to the two-position valve 502 from the control line port 204 in order to actuate the two-position valve 502 between its open and closed positions.

In some embodiments, as illustrated, the two-position valve 502 may be spring biased with a spring 510. The spring 510 may exhibit a spring force configured to generally maintain the two-position valve 502 in the open position. The spring force may be greater than a maximum closing pressure for the safety valve 112 (FIGS. 2A-2B). As a result, once hydraulic fluid is conveyed to the two-position valve 502 via the actuator conduit 508 at a pressure that exceeds the maximum closing pressure, the spring force of the spring 510 may be overcome and the two-position valve 502 may then be moved or actuated from the open position to the closed position.

In other embodiments, the two-position valve 502 may be a piston actuated valve (not shown). In such embodiments, the piston actuated valve may be ported to the inner diameter of the safety valve 112 (FIGS. 2A-2B) such that section pressure may be used to bias the two-position valve 502 to the open position. Once hydraulic fluid pressure is conveyed to the two-position valve 502 via the actuator conduit 508 at a force that exceeds the force from the section pressure, however, the two-position valve 502 may then be moved or actuated from the open position to the closed position.

In exemplary operation, hydraulic pressure or "control" pressure is introduced into the piston bore 208 via the control line 116 (FIGS. 1 and 2A) and associated control line port 204, as indicated by the arrows 314. Initially, the safety valve 112 (FIGS. 2A-2B) is in the closed position and the flow tube 220 (FIGS. 2A and 2B) is in its upmost position. Initially, the two-position valve 502 is also in its open position, thereby allowing the fluid pressure within the secondary bore 302 on either axial side of the second piston 216b to equalize via the return path 504.

As shown in FIG. 5A, the control pressure 314 is able to act on the piston head 212, thereby separating the piston head 212 from the up stop 214 and starting the first piston 216a moving in the downward direction (i.e., to the right in FIGS. 5A-5C). Since the first piston 216a sealingly engages the inner wall of the piston bore 208, the control pressure 314 may be able to act on the full piston area of the first piston 216a to move the piston assembly 210 in the downward direction.

Referring to FIG. 5B, as the first piston 216a moves in the downward direction, the flow tube 220 (FIGS. 2A and 2B) also begins to correspondingly move in the same direction as operatively coupled to the piston rod 218. During the beginning of the stroke of the first piston 216a, the control pressure 314 is isolated from and therefore unable to act on the second piston 216b, which may remain relatively motionless within the secondary piston bore 302. An opposing "section" pressure and the spring force of the power spring 236 (FIGS. 2A-2B) cooperatively act against the control pressure 314. The further downward the flow tube 220 moves, the greater the spring force that is built up in the power spring 236.

During this movement, the control pressure 314 applied through the control line port 204 may also be conveyed into the actuator conduit 508. Once the control pressure exceeds the spring force of the spring 510, the two-position valve 502 may be moved or otherwise actuated to its closed position.

In FIG. 5C, the first piston 216a is depicted as having axially bypassed the port 308, thereby allowing the control pressure 314 to escape into or otherwise enter the secondary piston bore 302 via the port 308. Once entering the secondary piston bore 302, the control pressure 314 may then be able to act on the second piston 216b, thereby forcing the secondary piston rod 304 into axial engagement with the flow tube 220 (FIG. 2A). Since the second piston 216b sealingly engages the inner wall of the secondary piston bore 302, the control pressure 314 is also able to act on the full piston area of the second piston 216b. As a result, once the control pressure 314 is able to act on both the first and second pistons 216a,b, an increased amount of hydraulic force may be applied on the flow tube 220 commensurate with the combined piston areas of both the first and second pistons 216a,b. The pistons 216a,b continue downward until the safety valve 112 (FIGS. 2A-2B) is fully open. Moreover, with the two-position valve 502 in its closed position, the return path 504 is blocked and therefore prevents fluid communication between either axial side of the second piston 216b.

Figure 6A:
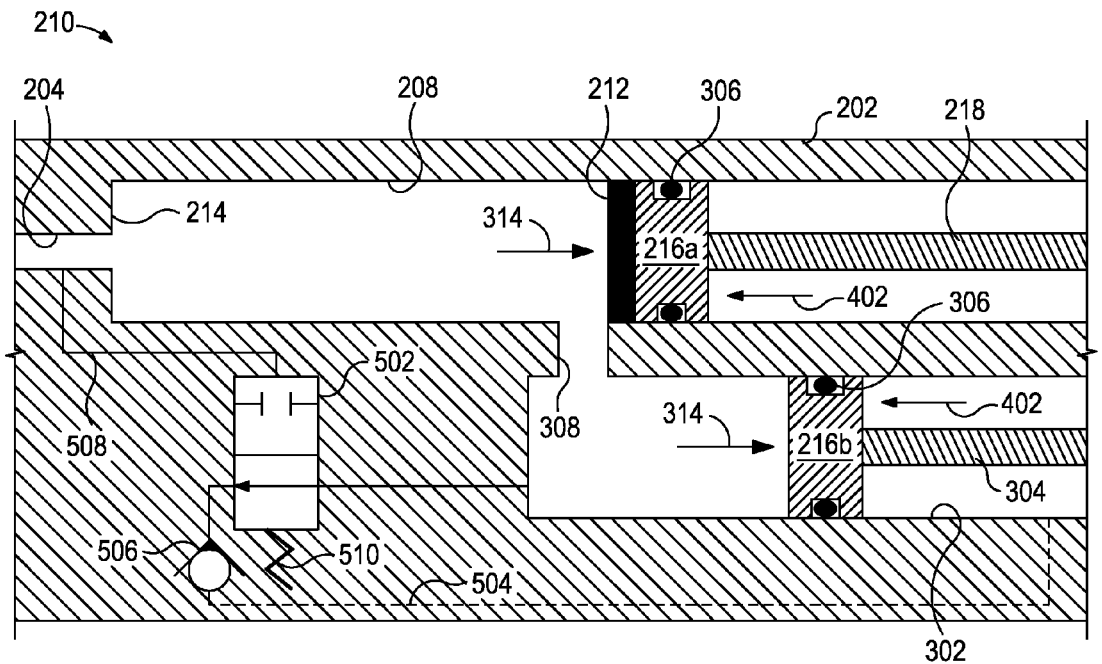
FIGS. 6A and 6B illustrate progressive cross-sectional side views of the piston assembly of FIGS. 5A-5C moving back to a closed position, according to one or more embodiments.
Figure 6B:
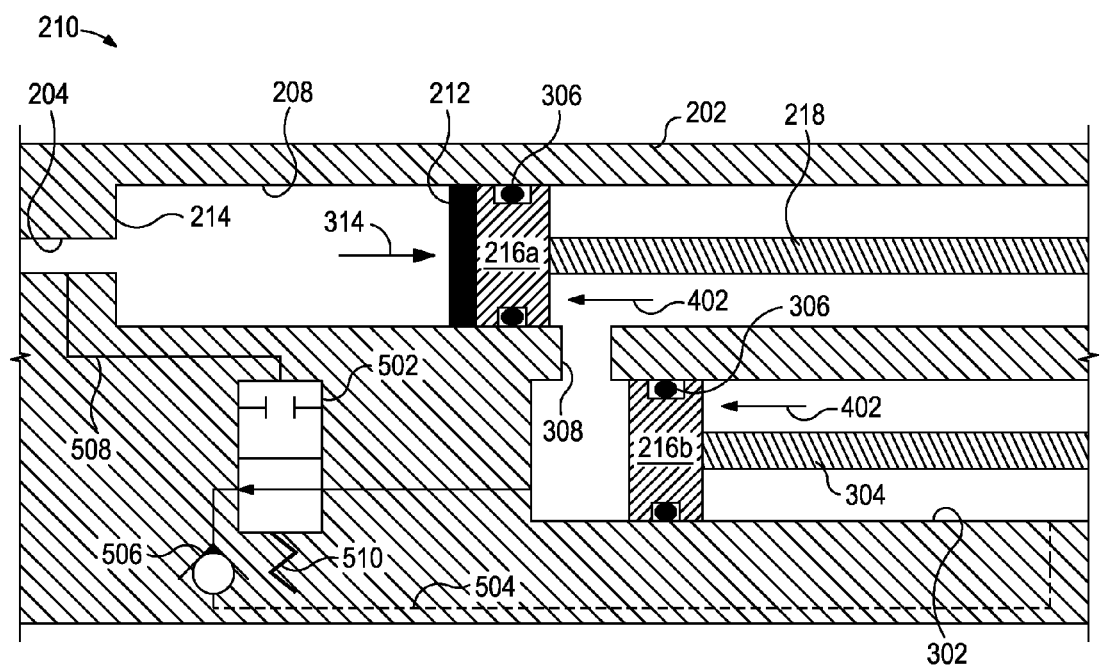

When it is desired to move the safety valve 112 (FIGS. 2A-2B) back to the closed position, the control pressure 314 may be reduced or otherwise eliminated. Referring to FIGS. 6A and 6B, with continued reference to FIGS. 5A-5C, illustrated are progressive cross-sectional side views of the piston assembly 210 as the safety valve 112 is moved back to the closed position, according to one or more embodiments. Once the control pressure 314 provided to the piston bores 208, 302 is reduced, the spring force built up in the power spring 236 (FIGS. 2A-2B) and the section pressure below the piston assembly 210 acts on the piston assembly 210, as indicated by the arrows 402. The opposing forces 402 serve to displace the piston assembly 210 back upwards within the piston bores 208, 302 (e.g., to the left in FIGS. 6A and 6B).

Reducing the control pressure 314 may also allow the two-position valve 502 to move back to its open position. More particularly, the control pressure 314 is reduced below the spring force of the spring 510, thereby enabling the spring 510 to move the two-position valve 502 and open the return path 504, which enables fluid communication through the two-position valve 502 between either axial side of the second piston 216b within the secondary piston bore 302.

In FIG. 6A, as the pistons 216a,b move axially upward within their corresponding piston bores 208, 302, the fluid pressure present within the piston bores 208, 302 is able to escape via the control line port 204. The fluid pressure within the secondary piston bore 302, for instance, may escape into the piston bore 208 via the port 308. The check valve 506 may be configured to prevent any produced fluids from circulating through return path 504 from below the second piston 216b to above the second piston 216b and subsequently proceeding into control line 116 (FIGS. 1 and 2A).

Once the first piston 216a encounters and occludes the port 308, however, the fluid pressure present within the secondary piston bore 302 is prevented from escaping into the piston bore 208 via the port 308. At this point, a spike in pressure in the secondary piston bore 302 may be experienced. The check valve 506 may be configured to allow the increased pressure to be relieved below the second piston 216b via the return path 504 until the port 308 is uncovered, at which point the pressure will be balanced above and below the second piston 216b. Accordingly, the return path 504 may prove useful in reducing the probability of the port 308 becoming obstructed.

In FIG. 6B, once the first piston 216b axially traverses or passes the port 308, the pressure within the secondary piston bore 302 will be balanced. At this point, only the piston area of the first piston 216a acts on the flow tube 220 (FIGS. 2A and 2B). This may prove advantageous since, as the power spring 236 (FIGS. 2A and 2B) expands, its spring force correspondingly decreases. As a result, less hydrostatic head force will be acting against the power spring 236, thereby allowing the safety valve 112 (FIGS. 2A-2B) to close at a pressure that is closer to the pressure required for its opening.

As used herein, the term "dynamic seal" is used to indicate a seal that provides pressure isolation between members that have relative displacement therebetween, for example, a seal that seals against a displacing surface, or a seal carried on one member and sealing against the other member, etc. A dynamic seal may comprise a material selected from the following: elastomeric materials, non-elastomeric materials, metals, composites, rubbers, ceramics, derivatives thereof, and any combination thereof. A dynamic seal may be attached to each of the relatively displacing members, such as a bellows or a flexible membrane. Alternatively, or in addition thereto, a dynamic seal may be attached to either of the relatively displacing members, such as in the case of a floating piston.

Embodiments disclosed herein include:

A. A safety valve that includes a housing defining a first piston bore and a secondary piston bore in fluid communication with each other via a port, the first piston bore being configured to receive hydraulic fluid pressure therein and the secondary piston bore being configured to receive the hydraulic fluid pressure from the first piston bore via the port, a first piston movably arranged within the first piston bore and having a first piston rod extending longitudinally therefrom and operatively coupled to a flow tube such that axial movement of the first piston correspondingly moves the flow tube, and a second piston movably arranged within the secondary piston bore and having a secondary piston rod extending longitudinally therefrom and axially engageable with the flow tube when the hydraulic fluid pressure acts on the second piston, wherein the hydraulic fluid pressure acts on the first piston until the first piston axially moves and exposes the port, whereby the hydraulic fluid pressure is then able to enter the secondary piston bore and also act on the second piston.

B. A method of actuating a safety valve that includes conveying hydraulic fluid pressure to a first piston bore defined within a housing of the safety valve, the first piston bore being in fluid communication with a secondary piston bore also defined in the housing via a port, axially displacing a first piston movably arranged within the first piston bore with the hydraulic fluid pressure, the first piston having a first piston rod extending longitudinally therefrom and operatively coupled to a flow tube arranged within a flow passage, conveying the hydraulic fluid pressure into the secondary piston bore via the port once the first piston axially bypasses the port, axially displacing a second piston movably arranged within the secondary piston bore with the hydraulic fluid pressure, the second piston having a secondary piston rod extending longitudinally therefrom and axially engageable with the flow tube, and moving the flow tube within the flow passage with the first and second pistons Each of embodiments A and B may have one or more of the following additional elements in any combination: Element 1: wherein the first piston bore and the secondary piston bore extend substantially parallel to each other within the housing. Element 2: wherein the first piston bore and the secondary piston bore are laterally offset from each other within the housing. Element 3: wherein the first piston bore and the secondary piston bore are radially offset from each other in the housing. Element 4: wherein one or both of the first and second pistons comprise one or more dynamic seals configured to dynamically seal against inner walls of the first piston bore and the secondary piston bore, respectively. Element 5: further comprising a return conduit that extends between the first piston bore and the secondary piston bore, and a check valve arranged within the return conduit and configured to prevent fluid flow from the first piston bore to the secondary piston bore, but allow fluid flow from the secondary piston bore to the first piston bore. Element 6: further comprising a two-position valve movable between an open position and a closed position as acted upon by the hydraulic fluid pressure, the two-position valve being in fluid communication with a source of the hydraulic fluid pressure, a return path that allows fluid communication through the two-position valve between portions of the secondary piston bore above and below the second piston when the two-position valve is in the open position, and a check valve arranged within the return path and configured to prevent produced fluids from acting on the first and second pistons, wherein, when the two-position valve is in the closed position, the return path is blocked and fluid communication is prevented above and below the second piston within the secondary piston bore. Element 7: wherein the two-position valve is spring biased with a spring, and wherein the spring has spring force that is overcome with the hydraulic fluid pressure in order to move the two-position valve from the open position to the closed position. Element 8: wherein the two-position valve is a piston actuated valve, and wherein the hydraulic fluid pressure acts on the piston actuated valve to move the two-position valve from the open position to the closed position. Element 9: wherein the first and second pistons are the same size. Element 10: wherein the first and second pistons are different sizes. Element 11: further comprising a valve closure device movable between an open position and a closed position and adapted to restrict fluid flow through a flow passage defined in the safety valve when in the closed position, wherein the flow tube is adapted to shift the valve closure device between open and closed positions, and a power spring arranged within a lower chamber defined within the housing and configured to bias the flow tube upwardly against the first and second pistons.

Element 12: further comprising dynamically sealing an inner wall of the first piston bore with a first dynamic seal arranged on the first piston as the first piston axially moves within the first piston bore, and dynamically sealing an inner wall of the secondary piston bore with a second dynamic seal arranged on the second piston as the second piston axially moves within the secondary piston bore. Element 13: wherein axially displacing the second piston comprises axially engaging the flow tube with the secondary piston rod and thereby axially moving the flow tube within the flow passage. Element 14: further comprising axially displacing the flow tube within the flow passage as the first and second pistons move within the first and secondary piston bores, respectively, moving a valve closure device with the flow tube from a closed position, which restricts fluid flow through the flow passage, to an open position, and compressing a power spring as the first and second pistons move within the first and secondary piston bores, respectively. Element 15: further comprising reducing the hydraulic fluid pressure within the first and secondary piston bores, biasing the first and second pistons upwardly within the first and secondary piston bores, respectively, with the power spring, occluding the port with the first piston as the first piston moves upwardly within the first piston bore, and conveying fluid pressure within the secondary piston bore to the first piston bore via a return conduit that extends between the first piston bore and the secondary piston bore, the return conduit having a check valve arranged therein and configured to prevent fluid flow from the first piston bore to the secondary piston bore, but allow fluid flow from the secondary piston bore to the first piston bore. Element 16: further comprising conveying the hydraulic fluid pressure to a two-position valve, moving the two-position valve from an open position, where a return path allows fluid communication through the two-position valve between portions of the secondary piston bore above and below the second piston, to a closed position, and blocking the return path when the two-position valve is in the closed position, and thereby preventing fluid communication above and below the second piston within the secondary piston bore. Element 17: further comprising reducing the hydraulic fluid pressure within the first and secondary piston bores, moving the two-position valve back to the open position as the hydraulic fluid pressure is reduced, biasing the first and second pistons upwardly within the first and secondary piston bores, respectively, with the power spring, occluding the port with the first piston as the first piston moves upwardly within the first piston bore, and relieving fluid pressure within the secondary piston bore above the second piston to below the second piston via the return path, the return path having a check valve arranged therein. Element 18: further comprising preventing produced fluids from circulating through the return path from below the second piston with the check valve. Element 19: wherein the two-position valve is spring biased with a spring, and wherein conveying the hydraulic fluid pressure to the two-position valve comprises overcoming a spring force of the spring to move the two-position valve from the open position to the closed position. Element 20: wherein the two-position valve is a piston actuated valve, and wherein conveying the hydraulic fluid pressure to the two-position valve comprises actuating the piston actuated to move the two-position valve from the open position to the closed position.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A safety valve, comprising:
    a housing defining a first piston bore and a secondary piston bore in fluid communication with each other via a port, the first piston bore receiving hydraulic fluid pressure and the secondary piston bore receiving the hydraulic fluid pressure from the first piston bore via the port;
    a first piston movably arranged within the first piston bore and having a first piston rod extending longitudinally from the first piston and operatively coupled to a flow tube, wherein axial movement of the first piston correspondingly moves the flow tube; and
    a second piston movably arranged within the secondary piston bore and having a secondary piston rod extending longitudinally from the second piston and axially engageable with the flow tube,
    wherein the hydraulic fluid pressure acts on the first piston until the first piston axially moves and exposes the port, whereby the hydraulic fluid pressure is then able to enter the secondary piston bore and also act on the second piston.

2. The safety valve of claim 1, wherein the first piston bore and the secondary piston bore extend substantially parallel to each other within the housing.

3. The safety valve of claim 2, wherein the first piston bore and the secondary piston bore are laterally offset from each other within the housing.

4. The safety valve of claim 2, wherein the first piston bore and the secondary piston bore are radially offset from each other in the housing.

5. The safety valve of claim 1, wherein one or both of the first and second pistons comprise one or more dynamic seals configured to dynamically seal against inner walls of the first piston bore and the secondary piston bore, respectively.

6. The safety valve of claim 1, further comprising:
    a return conduit that extends between the first piston bore and the secondary piston bore; and
    a check valve arranged within the return conduit and configured to prevent fluid flow from the first piston bore to the secondary piston bore, but allow fluid flow from the secondary piston bore to the first piston bore.

7. The safety valve of claim 1, further comprising:
    a two-position valve movable between an open position and a closed position as acted upon by the hydraulic fluid pressure, the two-position valve being in fluid communication with a source of the hydraulic fluid pressure;
    a return path that allows fluid communication through the two-position valve between portions of the secondary piston bore above and below the second piston when the two-position valve is in the open position; and a check valve arranged within the return path and configured to prevent produced fluids from acting on the first and second pistons, wherein, when the two-position valve is in the closed position, the return path is blocked and fluid communication is prevented above and below the second piston within the secondary piston bore.

8. The safety valve of claim 7, wherein the two-position valve is spring biased with a spring, and wherein the spring has spring force that is overcome with the hydraulic fluid pressure in order to move the two-position valve from the open position to the closed position.

9. The safety valve of claim 7, wherein the two-position valve is a piston actuated valve, and wherein the hydraulic fluid pressure acts on the piston actuated valve to move the two-position valve from the open position to the closed position.

10. The safety valve of claim 1, wherein the first and second pistons are the same size.

11. The safety valve of claim 1, wherein the first and second pistons are different sizes.

12. The safety valve of claim 1, further comprising:
a valve closure device movable between an open position and a closed position and adapted to restrict fluid flow through a flow passage defined in the safety valve when in the closed position, wherein the flow tube is adapted to shift the valve closure device between open and closed positions; and
a power spring arranged within a lower chamber defined within the housing and configured to bias the flow tube upwardly against the first and second pistons.

13. A method of actuating a safety valve, comprising:
conveying hydraulic fluid pressure to a first piston bore defined within a housing of the safety valve, the first piston bore being in fluid communication with a secondary piston bore also defined in the housing via a port;
axially displacing a first piston movably arranged within the first piston bore with the hydraulic fluid pressure, the first piston having a first piston rod extending longitudinally from the first piston and operatively coupled to a flow tube arranged within a flow passage;
conveying the hydraulic fluid pressure into the secondary piston bore via the port once the first piston axially bypasses the port;
axially displacing a second piston movably arranged within the secondary piston bore with the hydraulic fluid pressure, the second piston having a secondary piston rod extending longitudinally from the second piston and axially engageable with the flow tube; and
moving the flow tube within the flow passage with the first and second pistons.

14. The method of claim 13, further comprising:
dynamically sealing an inner wall of the first piston bore with a first dynamic seal arranged on the first piston as the first piston axially moves within the first piston bore; and
dynamically sealing an inner wall of the secondary piston bore with a second dynamic seal arranged on the second piston as the second piston axially moves within the secondary piston bore.

15. The method of claim 13, wherein axially displacing the second piston comprises axially engaging the flow tube with the secondary piston rod and thereby axially moving the flow tube within the flow passage.

16. The method of claim 13, further comprising:
axially displacing the flow tube within the flow passage as the first and second pistons move within the first and secondary piston bores, respectively;
moving a valve closure device with the flow tube from a closed position, which restricts fluid flow through the flow passage, to an open position; and
compressing a power spring as the first and second pistons move within the first and secondary piston bores, respectively.

17. The method of claim 16, further comprising:
reducing the hydraulic fluid pressure within the first and secondary piston bores;
biasing the first and second pistons upwardly within the first and secondary piston bores, respectively, with the power spring;
occluding the port with the first piston as the first piston moves upwardly within the first piston bore; and
conveying fluid pressure within the secondary piston bore to the first piston bore via a return conduit that extends between the first piston bore and the secondary piston bore, the return conduit having a check valve arranged therein and configured to prevent fluid flow from the first piston bore to the secondary piston bore, but allow fluid flow from the secondary piston bore to the first piston bore.

18. The method of claim 13, further comprising:
conveying the hydraulic fluid pressure to a two-position valve;
moving the two-position valve from an open position, where a return path allows fluid communication through the two-position valve between portions of the secondary piston bore above and below the second piston, to a closed position; and
blocking the return path when the two-position valve is in the closed position, and thereby preventing fluid communication above and below the second piston within the secondary piston bore.

19. The method of claim 18, further comprising:
reducing the hydraulic fluid pressure within the first and secondary piston bores;
moving the two-position valve back to the open position as the hydraulic fluid pressure is reduced;
biasing the first and second pistons upwardly within the first and secondary piston bores, respectively, with the power spring;
occluding the port with the first piston as the first piston moves upwardly within the first piston bore; and
relieving fluid pressure within the secondary piston bore above the second piston to below the second piston via the return path, the return path having a check valve arranged therein.

20. The method of claim 19, further comprising preventing produced fluids from circulating through the return path from below the second piston with the check valve.

21. The method of claim 18, wherein the two-position valve is spring biased with a spring, and wherein conveying the hydraulic fluid pressure to the two-position valve comprises overcoming a spring force of the spring to move the two-position valve from the open position to the closed position.

22. The method of claim 18, wherein the two-position valve is a piston actuated valve, and wherein conveying the hydraulic fluid pressure to the two-position valve comprises actuating the piston actuated to move the two-position valve from the open position to the closed position.

\* \* \* \* \*